US00RE38244E

(19) United States
(12) Reissued Patent
Han et al.

(10) Patent Number: US RE38,244 E
(45) Date of Reissued Patent: Sep. 2, 2003

(54) METHOD OF BYPASSING VOCODERS IN DIGITAL MOBILE COMMUNICATION SYSTEM

(75) Inventors: Jin Soo Han, Daejeon-shi (KR); Byong Jin Cho, Daejeon-shi (KR)

(73) Assignee: Hyundai Electronics Co., Ltd., Seoul (KR)

(21) Appl. No.: 09/648,467

(22) Filed: Aug. 11, 2000

Related U.S. Patent Documents

Reissue of:
(64) Patent No.: 5,793,810
Issued: Aug. 11, 1998
Appl. No.: 08/611,257
Filed: Mar. 5, 1996

(30) Foreign Application Priority Data

Mar. 7, 1995 (KR) ..... 95-4579

(51) Int. Cl.[7] ..... H04B 14/04
(52) U.S. Cl. ..... 375/242; 375/377; 455/422; 704/201; 370/342
(58) Field of Search ..... 375/242, 216, 375/377; 370/351, 522, 528; 455/422, 424, 428, 445, 560; 379/93.09; 704/201

(56) References Cited

U.S. PATENT DOCUMENTS

| | | | | | |
|---|---|---|---|---|---|
| 4,367,488 | A | * | 1/1983 | Leventer et al. | 348/467 |
| 4,380,027 | A | * | 4/1983 | Leventer | 348/467 |
| 5,151,919 | A | * | 9/1992 | Dent | 370/209 |
| 5,177,480 | A | * | 1/1993 | Clark | 341/51 |
| 5,363,404 | A | * | 11/1994 | Kotzin et al. | 370/335 |
| 5,488,653 | A | * | 1/1996 | Dimolitsas et al. | 379/100.17 |
| 5,550,893 | A | * | 8/1996 | Heidari | 375/216 |
| 5,568,483 | A | * | 10/1996 | Padovani et al. | 375/240 |
| 5,956,673 | A | * | 9/1999 | Weaver, Jr. et al. | 704/221 |

* cited by examiner

*Primary Examiner*—Betsy L. Deppe
(74) *Attorney, Agent, or Firm*—Merchant & Gould P.C.

(57) ABSTRACT

A method of bypassing vocoders in a digital mobile communication system, comprising the step of appending bypass mode data to data transmitted from a plurality of mobile stations, the bypass mode data instructing the vocoders not to perform encoding/decoding operations, and the step of transmitting the resultant data. According to the present invention, the unnecessary encoding/decoding operations are omitted for a mobile to mobile communication. Therefore, the present invention has the effect of removing the delay time and enhancing the voice quality.

7 Claims, 2 Drawing Sheets

METHOD OF BYPASSING VOCODERS IN DIGITAL MOBILE COMMUNICATION SYSTEM

Matter enclosed in heavy brackets [ ] appears in the original patent but forms no part of this reissue specification; matter printed in italics indicates the additions made by reissue.

BACKGROUND OF THE INVENTION

1. Field of the Invention

The present invention relates in general to a digital mobile communication system employing a code division multiple access (referred to hereinafter as CDMA) manner, and more particularly to a method of bypassing vocoders in the digital mobile communication system, in which a CDMA controller bypasses a voice signal without encoding and decoding it for communication between mobile stations, so that the voice quality can be enhanced.

2. Description of the Prior Art

Generally, for a mobile to LAND communication, a CDMA controller receives encoded voice data from a mobile station and decodes the received data. Then, the CDMA controller modulates the decoded data using a pulse code modulation (referred to hereinafter as PCM) manner and transmits the resultant PCM data to a switching system.

On the other hand, for a mobile to mobile communication, a CDMA controller of one mobile station receives PCM data from the other mobile station and encodes the received PCM data. Then, the CDMA controller transmits the encoded data to the corresponding mobile station.

As seen from the above description, the CDMA controller performs the unnecessary decoding and encoding operations.

However, now, the CDMA controller must perform the decoding and encoding operations for all communication processes. The decoding and encoding operations may not be necessary to some communication processes. In this case, if the decoding and encoding operations are performed, they result in an increase in delay time and a degradation in voice quality.

SUMMARY OF THE INVENTION

Therefore, the present invention has been made in view of the above problem, and it is an object of the present invention to provide a method of bypassing vocoders in a digital mobile communication system, in which the vocoders do not perform encoding and decoding operations when a communication line does not require the encoding and decoding operations, so that the voice quality can be enhanced and the delay time can be reduced.

*The present invention is directed to a method of bypassing vocoders in Mobile-to-Mobile Call (MMC). In the call establishment process of a digital mobile communication system, the Mobile Service Switching Center (MSC) usually decides if a call is a Mobile-to-Mobile call or a Mobile-to-Land call. This operation of MSC is known in the art.*

In accordance with the present invention, the above and other objects can be accomplished by a provision of a method of bypassing vocoders in a digital mobile communication system, comprising the step of appending bypass mode data to data transmitted from a plurality of mobile stations, the bypass mode data instructing the vocoders not to perform encoding/decoding operations, and the step of transmitting the resultant data.

BRIEF DESCRIPTION OF THE DRAWINGS

The above and other objects, features and advantages of the present invention will be more clearly understood from the following detailed description taken in conjunction with the accompanying drawings, in which.

DETAILED DESCRIPTION OF THE PREFERRED EMBODIMENTS

Figure 1:
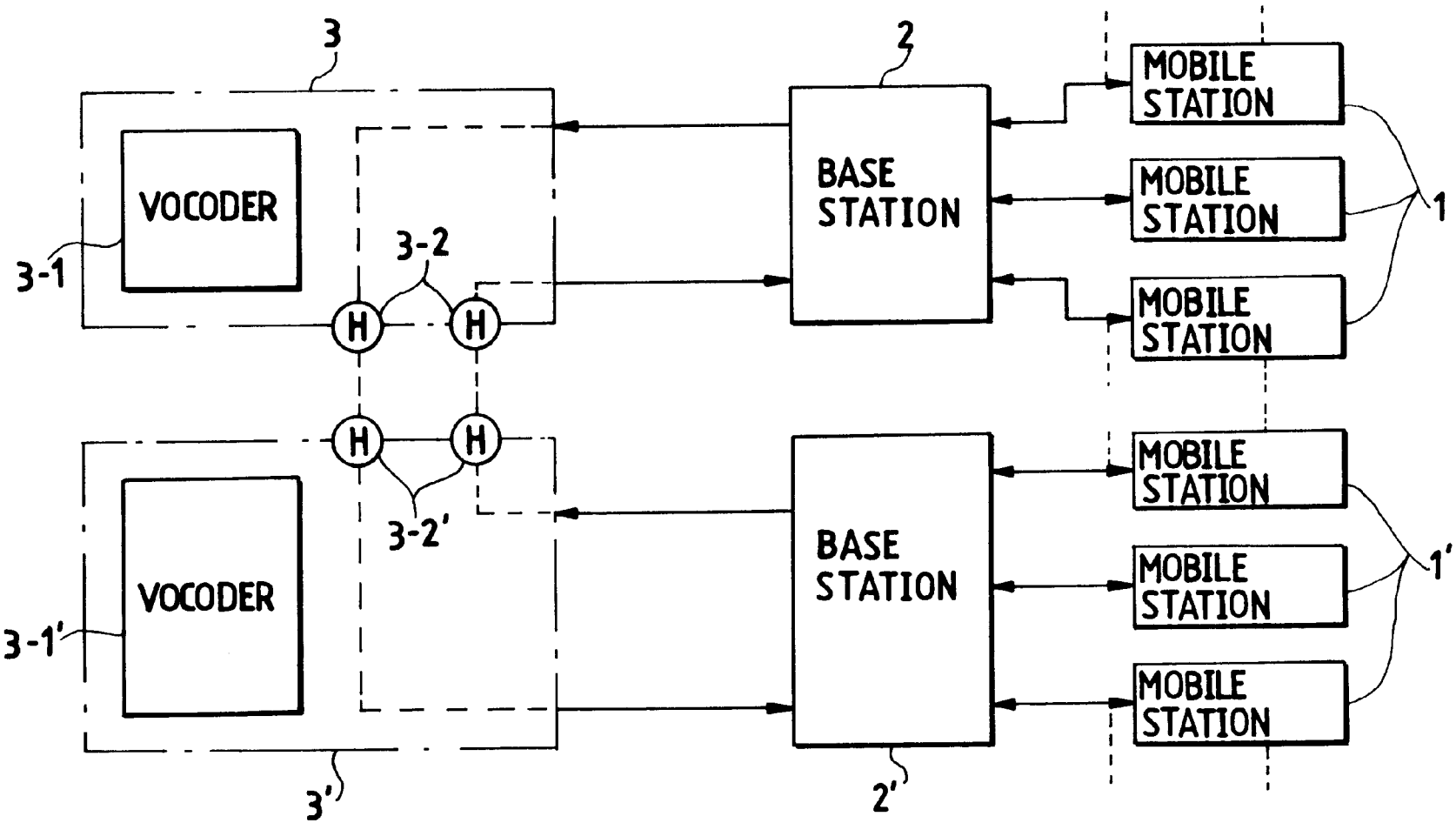
FIG. 1 is a block diagram of a signal transfer apparatus for embodying a method of bypassing vocoders in a digital mobile communication system using packet routing dedicated communication ports in accordance with an embodiment of the present invention.

Referring to FIG. 1, there is shown a block diagram of a signal transfer apparatus for embodying a method of bypassing vocoders in a digital mobile communication system using packet routing dedicated communication ports in accordance with an embodiment of the present invention. As shown in this drawing, the signal transfer apparatus comprises one base station 2 for receiving signals from a plurality of mobile stations 1, and a first selector 3 included in one CDMA controller. The signal transfer apparatus further comprises the other base station 2' for receiving signals from a plurality of mobile stations 1', and a second selector 3' included in the other CDMA controller. The first selector 3 includes a vocoder 3-1 for encoding/decoding a voice signal from the base station 2, and packet routing dedicated communication ports 3-2 for bypassing the voice signal from the base station 2 directly to the other CDMA controller without transferring it to the vocoder 3-1. The base station 2' and second selector 3' are the same in construction and operation as the base station 2 and first selector 3, respectively. A plurality of signal transfer apparatus with the above-mentioned construction may be connected to every switching system, as well-known in the art.

Now, the method of bypassing the vocoders in the digital mobile communication system using the signal transfer apparatus with the above-mentioned construction in accordance with the embodiment of the present invention will be described in detail.

The base stations 2 and 2' receive radio voice signals *as encoded data with appended bypass mode data* from the plurality of mobile stations 1 and 1' subscribing thereto and transmit the received signals to the CDMA controllers, respectively.

The CDMA controllers process the received signals in such a manner as will hereinafter be described in detail.

Data formats of the received signals are retrieved by the selectors 3 and 3' in the CDMA controllers and call control processors (not shown) therein which are connected to the packet routing dedicated communication ports 3-2 and 3-2', respectively. In accordance with the retrieved result, it is determined whether the received signals are to be passed to the vocoders 3-1 and 3-1' or to be bypassed.

Channels of the received signals are matched with those of the selectors 3 and 3'. Then, signals to be bypassed are bypassed through the packet routing dedicated communication ports 3-2 and 3-2'. In other words, the selectors and call control processors determine based on the data formats whether the received signals are to be passed to the vocoders or to be bypassed.

The voice signals to the vocoders 3-1 and 3-1' are encoded and decoded thereby and then transmitted to the CDMA controller of the other party. The bypassed voice signals are transmitted directly to the CDMA controller of the other party through the packet routing dedicated communication ports 3-2 and 3-2'.

The transmission and reception operations of the first selector 3 in the CDMA controller will hereinafter be described to explain the above-mentioned process in more detail.

First, the reception operation of the first selector 3 in the CDMA controller will hereinafter be described.

Encoded data from a selected one of the mobile stations 1 is transmitted to the first selector 3 through the base station 2. The transmitted data is not applied to the vocoder 3-1 but transferred to the second selector 3' in the CDMA controller of the other party through the packet routing dedicated communication ports 3-2.

Next, the transmission operation of the first selector 3 in the CDMA controller will hereinafter be described.

Bypassed data from the second selector 3' in the CDMA controller of the other party is transmitted to the first selector 3. The transmitted data is temporarily stored in a buffer (not shown). Under this condition, when an interrupt signal TX TICK indicating a transmission time point is made active, the stored data from the buffer is transmitted to a selected one of the mobile stations 1 through the base station 2. The transmission and reception operations of the second selector 3' in the CDMA controller are performed in the same manner as those of the first selector 3 and a description thereof will thus be omitted.

As mentioned above, the packet routing dedicated communication ports 3-2 and 3-2' are additionally installed on the existing hardware equipment. This has the effect of simplifying a software work. Also, the unnecessary work or the decoding and encoding operations in the CDMA controller are omitted, resulting in the improvement in voice quality. Further, the delay time resulting from the encoding operation can be shortened.

Figure 2:
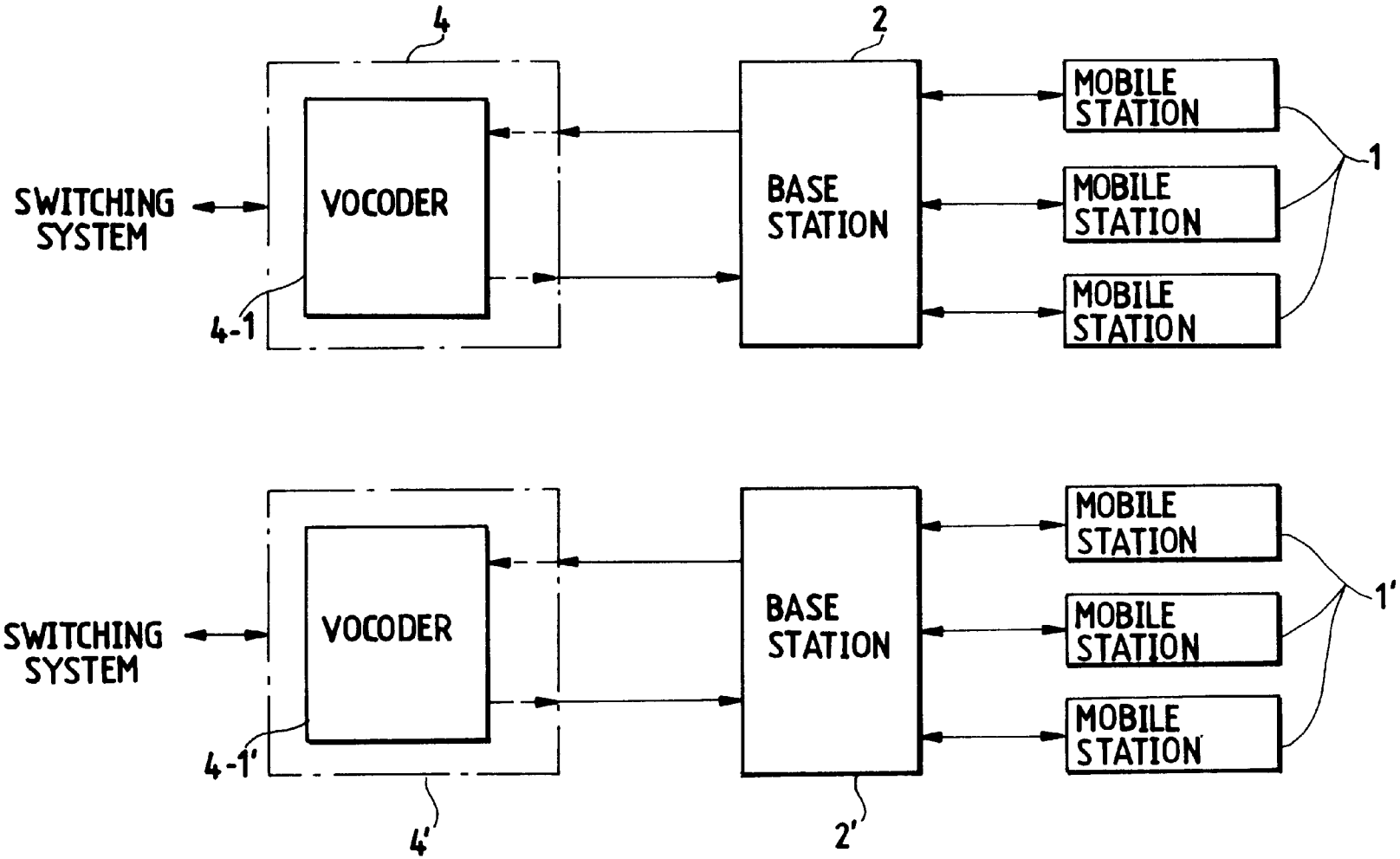
FIG. 2 is a block diagram of a signal transfer apparatus for embodying a method of bypassing vocoders in a digital mobile communication system using a vocoder control program in accordance with an alternative embodiment of the present invention.

Referring to FIG. 2, there is shown a block diagram of a signal transfer apparatus for embodying a method of bypassing vocoders in a digital mobile communication system using a vocoder control program in accordance with an alternative embodiment of the present invention. As shown in this drawing, the signal transfer apparatus comprises one base station 2 for receiving signals from a plurality of mobile stations 1, and a first selector 4 included in one CDMA controller. The signal transfer apparatus further comprises the other base station 2' for receiving signals from a plurality of mobile stations 1', and a second selector 4' included in the other CDMA controller. The first selector 4 includes a vocoder 4-1 for encoding/decoding a voice signal from the base station 2. The base station 2' and second selector 4' are the same in construction and operation as the base station 2 and first selector 4, respectively.

Now, the method of bypassing the vocoders in the digital mobile communication system using the signal transfer apparatus with the above-mentioned construction in accordance with the alternative embodiment of the present invention will be described in detail.

To determine whether the present mode is a bypass mode or an existing mode, the selectors 4 and 4' have frame pack and unpack functions for producing a traffic data format of the bypass mode. The receiving selector converts the mode of its vocoder into the bypass mode. Here, all base stations and selectors can perform a bidirectional communication. For this reason, the reference numerals for the discrimination between transmitting and receiving selectors will be omitted.

The vocoder of bypass mode analyzes a PCM data format inputted therein, to determine whether the data frame is to be transmitted in the bypass mode. If it is determined that the data frame is to be transmitted in the bypass mode, the vocoder sets its mode to the bypass mode and then transmits the data.

Noticeably, a data rate must be changed to transmit a voice signal in the bypass mode. To this end, data format conversion is performed to match a mobile station's data speed with a PCM data speed for the bypassing, as will hereinafter be mentioned in more detail.

The mobile station's data speed can be matched with the PCM data speed of 64 Kbps by repeating 22-byte data of the mobile station seven times and adding a 6-byte header to the resultant data. That is, 22 bytes (mobile station's encoded data)·7+6=160 samples (bytes)/20 msec where, 160 samples (bytes) indicate an amount of data stored in the unit of frame and 20 msec indicates a transmission time required in the unit of frame (i.e., 125 μsec (8 KHz)·160 samples).

The voice signal received in the bypass mode is directly converted into PCM data for transmission without passing through decoding and encoding operations. This has the effect of shortening the delay time resulting from the encoding operation, which is conventionally 47.5 msec in the unit of frame.

The conventional delay time is required in the following manner. Namely, a first data frame is received at a rate of 20 msec and then encoded. A second data frame is received at the moment that the encoded first data frame is transmitted. A third data frame is received at the moment that the encoded second data frame is transmitted. In this manner, about 380 samples are delayed for an interval of 47.5 msec.

The transmission and reception operations of the first selector 4 in the CDMA controller will hereinafter be described to explain the above-mentioned process in more detail.

First, the reception operation of the first selector 4 in the CDMA controller will hereinafter be described.

Encoded data from a selected one of the mobile stations 1 is transmitted to the first selector 4 through the base station 2. In the first selector 4, the vocoder 4-1 receives the encoded data. In the case where the received data is to be bypassed, the vocoder 4-1 performs no decoding operation for the received data and changes only the data rate to transmit the received data to a PCM line.

Next, the transmission operation of the first selector 4 in the CDMA controller will hereinafter be described.

Bypassed data from the second selector 4' in the CDMA controller of the other party is transmitted to the first selector 4. In the first selector 4, the vocoder 4-1 receives the bypassed data and performs no encoding operation for the received data. The vocoder 4-1 then changes only the data rate to transmit the received data to a selected one of the mobile stations 1 through the base station 2 when an interrupt signal TX TICK indicating a transmission time point is made active. The transmission and reception operations of the second selector 4' in the CDMA controller are performed in the same manner as those of the first selector 4 and a description thereof will thus be omitted.

As apparent from the above description, according to the present invention, the unnecessary encoding/decoding operations are omitted for the mobile to mobile communication. Therefore, the present invention has the effect of removing the delay time and enhancing the voice quality.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A method of transmitting data in a digital mobile communication system employing vocoders, comprising the steps of:

appending bypass mode data to encoded data transmitted from a plurality of mobile stations, said bypass mode data instructing a first vocoder to not decode the data and a second vocoder to not encode the data; and transmitting the resultant data.

2. The method of claim 1, wherein each of said vocoders is adapted to set its mode to a bypass mode, to analyze a data format of an input signal to determine whether the input signal is to be bypassed, to change [only] a data rate *only* if it is determined that the input signal is to be bypassed *and* to transmit the *bypassed* input signal at the changed data rate.

3. A method of transmitting data in a digital mobile communication system employing vocoders, comprising the steps of:

appending bypass mode data to encoded data transmitted from a plurality of mobile stations, said bypass mode data instructing a first selector having a first vocoder and a second selector having a second vocoder *whether* to bypass the *respective* vocoders and transfer the data to packet routing dedicated communication ports; and transmitting the transferred data.

*4. The method of claim 2, wherein the data rate is changed by matching a mobile station's data speed with a PCM data speed.*

*5. The method of claim 4, wherein the mobile station's data speed is matched with the PCM data speed of 64 Kbps by repeating 22-byte data of the mobile station seven times and adding a 6-byte header to the resultant data.*

*6. The method of claim 3, wherein said appending step includes a step of determining based on data format of said bypass mode data whether the transmitted encoded data are to be passed to the vocoders or to bypass the vocoders.*

*7. The method of claim 6, wherein the determination of bypassing vocoders is made by call control processors which are connected to the packet routing dedicated communication ports.*

* * * * *